(12) United States Patent
Coupard et al.

(10) Patent No.: US 10,288,518 B2
(45) Date of Patent: May 14, 2019

(54) METHOD FOR MONITORING AN AIRCRAFT ENGINE IN OPERATION DURING A FLIGHT

(71) Applicant: Safran Aircraft Engines, Paris (FR)

(72) Inventors: Josselin Coupard, Moissy-Cramayel (FR); Ronan Louis Castrec, Moissy-Cramayel (FR); Rafik Zouari, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 15/571,377

(22) PCT Filed: May 4, 2016

(86) PCT No.: PCT/FR2016/051051
§ 371 (c)(1),
(2) Date: Nov. 2, 2017

(87) PCT Pub. No.: WO2016/177971
PCT Pub. Date: Nov. 10, 2016

(65) Prior Publication Data
US 2018/0306666 A1    Oct. 25, 2018

(30) Foreign Application Priority Data

May 5, 2015    (FR) ..................... 15 54013

(51) Int. Cl.
*G01M 1/22*    (2006.01)
*G07C 5/00*    (2006.01)
(Continued)

(52) U.S. Cl.
CPC ............... *G01M 1/22* (2013.01); *B64D 45/00* (2013.01); *G01H 1/003* (2013.01); *G01H 3/14* (2013.01);
(Continued)

(58) Field of Classification Search
USPC ....................................... 701/29.4
See application file for complete search history.

(56) References Cited

U.S. PATENT DOCUMENTS 7,617,670 B2 * 11/2009 Truax ................. F02C 7/04
137/15.1
2004/0060347 A1    4/2004 Comperat et al.
(Continued)

FOREIGN PATENT DOCUMENTS

EP    1 367 226 A1    12/2003
FR    2 941 049 A1    7/2010
(Continued)

OTHER PUBLICATIONS

International Search Report and Written Opinion dated Aug. 4, 2016 in French Patent Application PCT/FR2016/051051 (with English translation of category of Documents), 15 pages.
(Continued)

*Primary Examiner* — Tyler D Paige
(74) *Attorney, Agent, or Firm* — Oblon, McClelland, Maier & Neustadt, L.L.P.

(57) ABSTRACT

A method for monitoring an aircraft engine during flight, which includes the steps of: for at least one characteristic frequency of the operation of the engine, measuring at least one synchronous vibration level value; for at least one module of the engine, estimating an out-of-balance value of the module in accordance with the one or more vibration level values measured and at least one sensitivity coefficient; estimating a balancing margin of the module in accordance with the out-of-balance value of said module and a maximum threshold; (d) estimating a remaining number of flights of the aircraft prior to balancing and/or a quality indicator of a preceding balancing operation in accordance with the one
(Continued)

or more estimated balancing margins and data representing past balancing operations of the engine.

14 Claims, 5 Drawing Sheets

(51) Int. Cl.
| | | |
|---|---|---|
| B64D 45/00 | (2006.01) | |
| G01H 1/00 | (2006.01) | |
| G01H 3/14 | (2006.01) | |
| G01M 1/14 | (2006.01) | |
| G01M 15/12 | (2006.01) | |
| G01M 15/14 | (2006.01) | |
| G01M 1/28 | (2006.01) | |
| G07C 5/08 | (2006.01) | |
| G05B 23/02 | (2006.01) | |

(52) U.S. Cl.
CPC ............... *G01M 1/14* (2013.01); *G01M 1/28* (2013.01); *G01M 15/12* (2013.01); *G01M 15/14* (2013.01); *G05B 23/0283* (2013.01); *G07C 5/004* (2013.01); *G07C 5/008* (2013.01); *G07C 5/085* (2013.01); *G07C 5/0808* (2013.01); *B64D 2045/0085* (2013.01)

(56) References Cited

U.S. PATENT DOCUMENTS

| | | | |
|---|---|---|---|
| 2005/0149234 A1 | 7/2005 | Vian et al. | |
| 2007/0227153 A1* | 10/2007 | Truax | F02C 7/04 60/772 |
| 2007/0227246 A1 | 10/2007 | Vian et al. | |
| 2007/0272013 A1 | 11/2007 | Vian et al. | |
| 2008/0124480 A1* | 5/2008 | Shen | C23C 4/08 427/456 |
| 2010/0003129 A1* | 1/2010 | Truax | F02C 7/04 415/182.1 |
| 2011/0046933 A1* | 2/2011 | Skelly | F01D 25/164 703/2 |
| 2011/0276247 A1 | 11/2011 | Carratt et al. | |
| 2012/0265466 A1* | 10/2012 | Morgana | G01R 31/2849 702/81 |
| 2016/0032725 A1* | 2/2016 | Heidari | G01M 1/22 701/33.1 |

FOREIGN PATENT DOCUMENTS

| | | |
|---|---|---|
| FR | 2 947 335 A1 | 12/2010 |
| WO | WO 95/34871 A1 | 12/1995 |

OTHER PUBLICATIONS

French Preliminary Search Report dated Feb. 29, 2016 in Patent Application No. FR1554013 (with English translation of category of documents) therein.

Omar Djebili,"Contribution à la maintenance prédictive par analyse vibratoire des composants mécaniques tournants. Application aux butées à billes soumises à la fatigue de contact de roulement (Contribution to the predictive maintenance by vibration analysis of revolving mechanical components. Application on the thrust ball bearings subjected to a rolling contact Fatigue)"., XP055254003, 2013, Universite De Reims Champagne Ardenne Ecole Doctorale Sciences Technologie Sante (547), 155 pages (with English abstract).

* cited by examiner

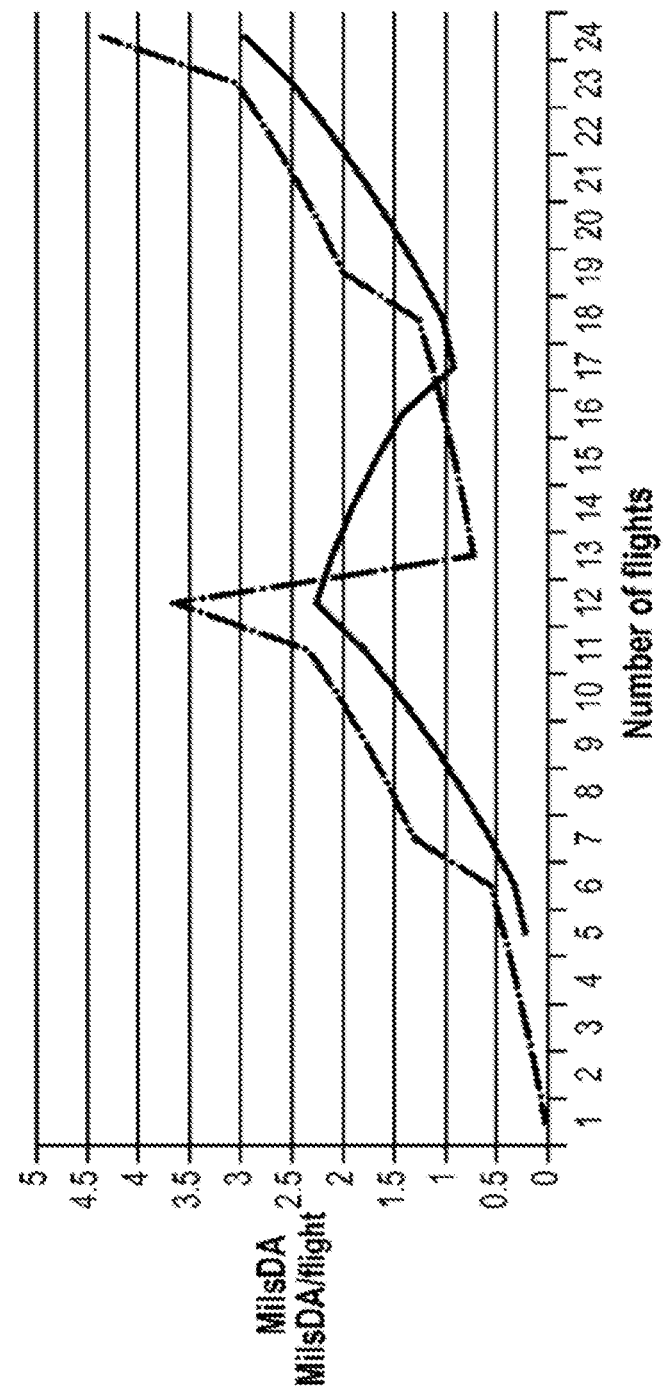

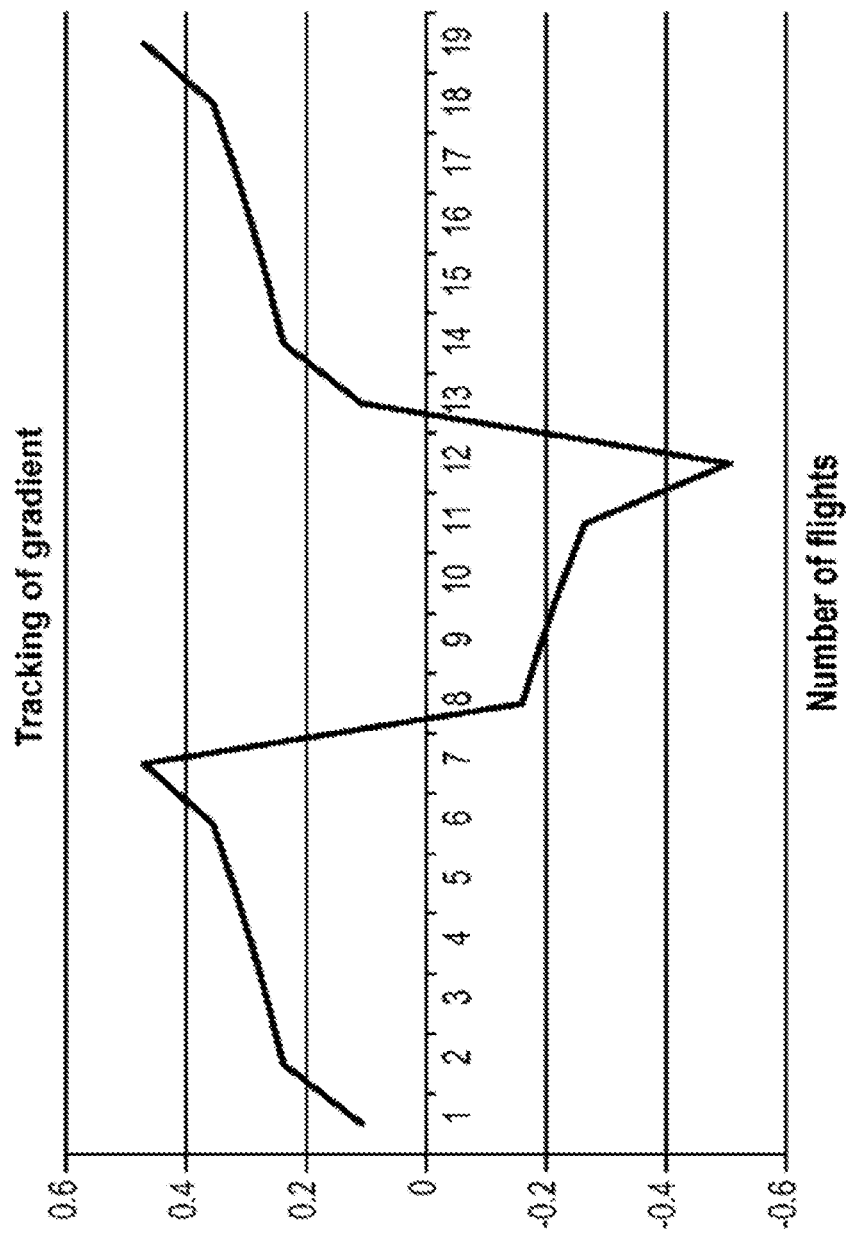

METHOD FOR MONITORING AN AIRCRAFT ENGINE IN OPERATION DURING A FLIGHT

GENERAL TECHNICAL FIELD

The present invention relates to the field of maintenance of aeronautical equipment.

More precisely, it relates to a method for estimating the normal character or not of a measured value of a physical parameter of an engine.

PRIOR ART

An aircraft turbine engine may comprise two rotating parts which with time and operating events of said turbine engine may reveal an unbalance state during their rotation phases. The occurring unbalance is modelled especially by an attached mass positioned virtually on a point located outside the axis of rotation of the two rotating parts.

The attached mass, by extension called unbalance, generates a non-compensated centrifugal force which "rotates" and causes unpleasant or even dangerous vibration for the engine integrity if it is too strong.

This problem may be corrected by balancing on the ground of the engine, consisting of installation of weights to compensate the occurring unbalance by a new opposite unbalance. This is a complex manual operation requiring a very high level of precision, and which is performed during the revision visits to the turbine engine.

The technical difficulty stems from there currently being no way of anticipating that balancing must be done, and no return on the quality of the balancing completed. A "vibratory" alert transmitted to the cockpit is the sole indicator to alert the operator that it is necessary to correct poor balancing.

In other words, the balancing is done systematically during maintenance operations, or following a cockpit vibratory alert.

It would therefore be preferable to reliably, efficiently and reproducibly monitor an engine so as to plan the next balancing, or if balancing has just been done, to estimate its quality.

PRESENTATION OF THE INVENTION

According to a first aspect the present invention proposes a method for monitoring an aircraft engine operating during a flight, the method being characterized in that it comprises performing steps of (a) For at least one characteristic frequency of the operation of the engine, measuring by a sensor disposed in the engine of at least one vibration level value synchronous with said characteristic frequency;

(b) For at least one module of said engine, estimating by data-processing means of an unbalance value of said module as a function of the measured vibration level value(s) and of at least one sensitivity coefficient of said module associated with said characteristic frequency;

(c) Estimating by the data-processing means a balancing margin of said module as a function of the unbalance value of said module and a maximum threshold associated with the module;

(d) Estimating a remaining number of flights of said aircraft before balancing and/or an indicator of quality of a previous balancing as a function of the estimated balancing margin(s) and of data representative of past balancings of the engine stored in a database stored on data-storage means, and transmitting to interface means.

According to other advantageous and non-limiting features:

step (a) comprises prior measuring by another sensor disposed in the engine of at least one characteristic frequency of the operation of the engine;

said engine is an at least double body engine having at least two characteristic frequencies including a low-pressure frequency (LP) and a high-pressure frequency (HP), each balancing being low-pressure balancing and/or high-pressure balancing;

the LP frequency is the rotation frequency of a low-pressure assembly of the engine and the HP frequency is the rotation frequency of a high-pressure assembly of the engine;

each module of the engine is associated with the high-pressure assembly or with the low-pressure assembly, and selected from a fan, at least one turbine, and at least one compressor;

each past balancing is associated with an installed unbalance value and with a time parameter;

said flight of said aircraft comprises a sequence of operational phases of said engine, each operational phase having for each characteristic frequency a nominal value and/or a nominal derivative of the characteristic frequency, step (a) comprising the measurement of at least one vibration level value of said engine for at least one of said phases of the operation, the measurement being taken at an instant of said operational phase such that the characteristic frequency has an instantaneous value and/or a derivative substantially equal respectively to the nominal value and to the nominal derivative of the characteristic frequency associated with the operational phase;

said vibration level value of said module synchronous with said characteristic frequency corresponds to the amplitude of said characteristic frequency in the frequency spectrum of vibration of the engine;

step (b) comprises sub-steps of:

For each characteristic frequency, estimating a proportion of unbalance of the module at the characteristic frequency as a function of the measured vibration level values;

For each characteristic frequency, estimating a level of vibration of the module synchronous with the characteristic frequency;

For each characteristic frequency, estimating an unbalance level of the module associated with the characteristic frequency;

Estimating the unbalance value.

The method is such that:

The level of vibration of the module synchronous with a characteristic frequency is estimated as the product of the measured level of vibration synchronous with the characteristic frequency and the estimated proportion of the unbalance of said module synchronous with the characteristic frequency;

The unbalance level of the module associated with a characteristic frequency is estimated as the ratio of the level of vibration of said module synchronous with the characteristic frequency on the sensitivity coefficient of said module synchronous with the characteristic frequency;

The unbalance value is estimated as the average of the unbalance levels of said module associated with each of the characteristic frequencies.

According to a second aspect, the invention relates to equipment for monitoring an aircraft engine operating during a flight, comprising data-processing means, data-storage means storing in a database of data representative of past balancings of the engine, and interface means, the equipment being characterized in that the data-processing means are configured to:
- for at least one characteristic frequency of the operation of the engine, receive from a sensor disposed in the engine at least one vibration level value synchronous with said characteristic frequency;
- for at least one module of said engine, estimate an unbalance value of said module as a function of the value(s) of level of measured vibrations and of at least one sensitivity coefficient of said module associated with said characteristic frequency;
- estimate a balancing margin of said module as a function of the unbalance value of said module and of a maximum threshold associated with the module;
- estimate a remaining number of flights of said aircraft before balancing and/or of the quality of a previous balancing as a function of the estimated balancing margin(s) and of the data representative of past balancings of the engine stored in the database stored on data-storage means;
- transmit the result to interface means.

According to a third aspect, the invention relates to a system comprising:
- an aircraft engine equipped with a sensor for measuring at least one vibration level value synchronous with a characteristic frequency of the engine;
- equipment according to the second aspect for monitoring an aircraft engine operating during a flight.

According to a fourth and a fifth aspect, the invention relates to a computer program product comprising code instructions for executing a method according to the first aspect of the invention for monitoring an aircraft engine operating during a flight, when said program is executed on a computer; and storage means readable by computer equipment on which a computer program product comprises code instructions for executing a method according to the first aspect of the invention for monitoring an aircraft engine operating during a flight.

PRESENTATION OF THE FIGURES

Other characteristics and advantages of the present invention will become apparent from reading the following description of a preferred embodiment. This description will be given in reference to the appended drawings, wherein:

FIGS. 4a-4b illustrate complementary curves obtained via a preferred embodiment of the method according to the invention.

DETAILED DESCRIPTION

Figure 1:
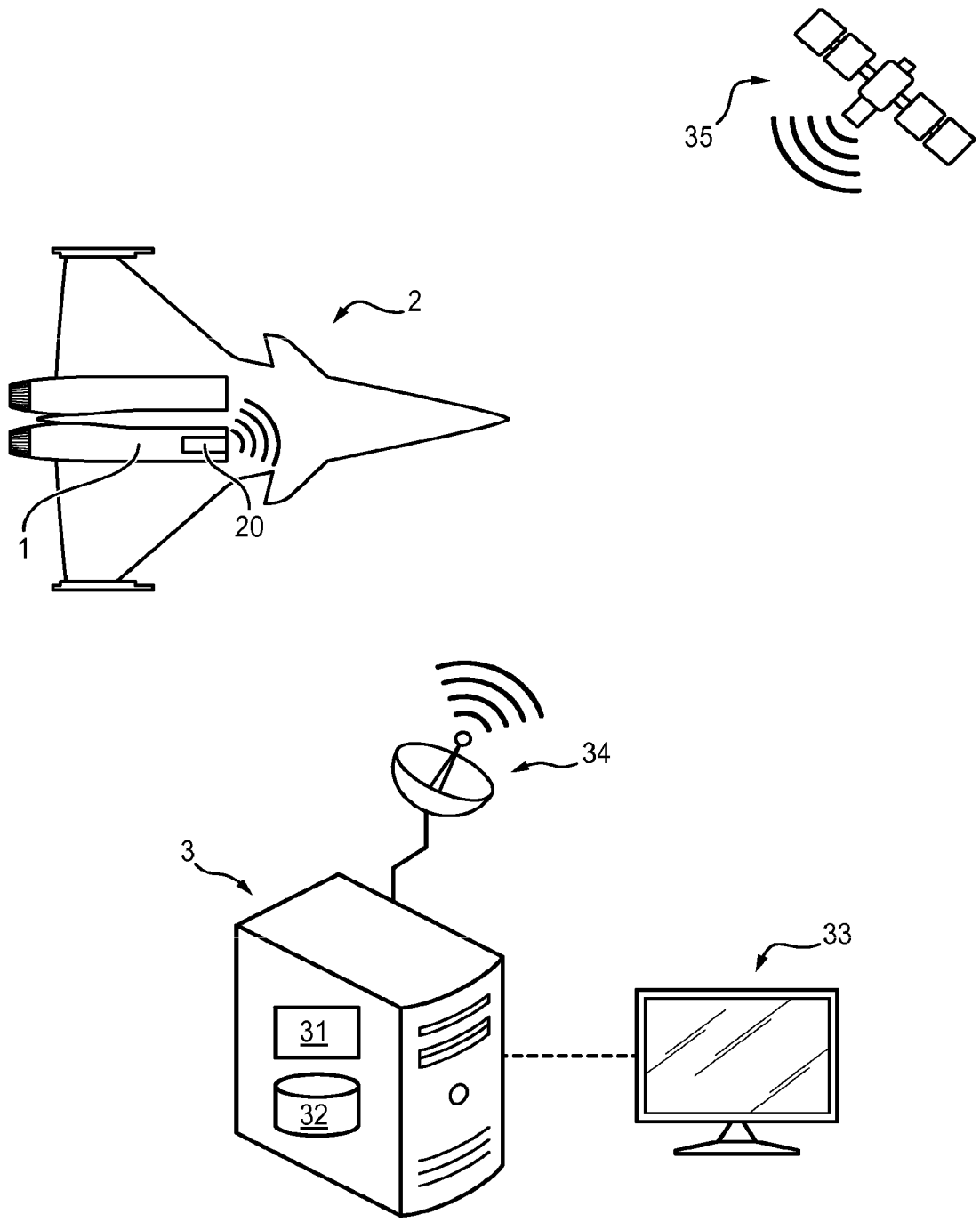
FIG. 1 illustrates an example of environment in which the method according to the invention is executed.

In reference to FIG. 1, the present method is a method for monitoring an engine 1 of an aircraft 2 operating during flight.

Monitoring means evaluation of an unbalance level of the engine 1, for planning the next balancing of the engine 1. As is preferred, this is "pseudo real time" monitoring: the engine 1 is equipped with sensors 20 (which monitor the unbalance for a speed or a given operating frequency of the engine, as will be evident), active during flight of the aircraft 2. The latter regularly sends short messages (instantaneous or deferred) to the ground, comprising the values of measurements coming from the sensors 20. These messages are sent via transmission means, for example by satellite 35 (ACARS protocol especially), and equipment 3 disposed on the ground, comprising data-processing means 31 (e.g. a processor) and data-storage means 32 (e.g. a hard drive), receives the data contained in these messages via a base station 34 and processes them to execute the method.

The skilled person will understand that there is no limitation associated with the procedure for transmitting measurements to the equipment 3 (e.g. it is possible for measurements to be stored on the aircraft 2 during flight, and transmitted in bloc to the equipment 3 after landing). Also, processing may be differed over time. It is even possible for the equipment 3 to be integrated into the aircraft 2.

The equipment 3 (or other equipment) is fitted with interface means 33 (such as a keyboard and a screen) to interact with a user of the system or other equipment, and in particular for displaying results (see below).

The engine 1 is typically all or part of a turbine engine, double-flow in particular. As will be evident, the present engine 1 is preferably an at least double-body engine (or even triple), i.e., it has a high-pressure (HP) assembly and a low-pressure (LP) assembly each having different rotation frequencies (each HP/LP assembly consists of a HP/LP turbine and a HP/LP compressor connected by a rotor). The rotors of each of the assemblies are typically disposed in each other to enable this uncoupling. The engine 1 comprises "major modules", i.e., main components, each in rotation when the engine 1 is operating, and likely to be at the origin of balancing problem. There are typically five of these modules in the case of a double-body engine 1: the fan (forming part of the LP assembly), the LP compressor, the HP compressor, the HP turbine and the LP turbine. There may be more (or fewer) compressors/turbine couples.

The rotation frequencies associated with each HP/LP assembly (expressed in number of rotations completed per time unit) are characteristic frequencies of the engine 1, to the extent where any vibration of the engine caused by an unbalance is at a frequency function of at least one of these frequencies of rotation.

These frequencies define two engine speeds called N1 and N2, respectively LP and HP. More precisely, at speed N1 the characteristic frequency of the engine 1 is the rotation frequency of the LP assembly, and at speed N2 the characteristic frequency of the engine 1 is the rotation frequency of the HP assembly. It is evident that each major module of the engine is associated with one of the characteristic frequencies, which is the frequency at which this module rotates. In the following present description, the example of two characteristic frequencies (an LP frequency and a HP frequency) and therefore two classes of modules (LP and HP modules) is used, but it is noted that there may be more, since there are triple-body engines, for example. In general, each characteristic frequency corresponds to an engine speed. As will be clear, one or more of the sensors 20 could be dedicated to determining the characteristic frequencies of the engine.

It is understood that in all cases the values of these characteristic frequencies of the engine 1 are not constant and depend naturally on the operating conditions of the engine, in particular the operating phases of the engine 1.

In fact, a flight of the aircraft 2 always comprises a repeatable sequence of flight phases which are in general "Taxi-out" (moving the planer on the ground prior to take-off), take-off, ascent, generally cruising (if the flight is long enough), descent and "Taxi-in" (moving the plane on the ground after landing).

Each of these phases is either "stabilized" (typically when cruising and taxiing) and is characterized by a stable speed, i.e., the characteristic frequency or the characteristic frequencies of the engine 1 are substantially constant (substantially zero derivative), or "transitory" (typically during take-off, on ascent and on descent) and is characterized by rising or falling characteristic frequencies of the engine 1 (derivatives of absolute substantially high and constant value).

Therefore, each operational phase for each characteristic frequency is associated with a nominal value and/or a nominal derivative of the characteristic frequency. They may be stored in the database of storage means 32. It is noted in the transitional phases that the value of a characteristic frequency is not constant, the nominal value may be for example the average value stated for the phase.

It is understood in general that all these data descriptive of characteristic frequencies phase by phase may be obtained by statistical analysis of a large number of flights of the same engine 1 model.

Monitoring Method

The present method comprises two large sets of steps (a)-(c) and (d). A first set of steps (a)-(c) aims to provide for a module (and advantageously for each module) an indicator called "balancing margin" of the module, the aim of which is to ensure that the engine may still be operated and, if it may still be operated, to estimate the number of flights to be made before rebalancing of the engine. As will be evident later, the balancing margin is typically a magnitude homogeneous to an unbalance value, which may be seen as tolerance to the rise of the unbalance before alert. In other words:

if the balancing margin is high, the vibrations are very weak and the unbalance can further increase substantially before balancing is necessary; and if the balancing margin is close to zero, the unbalance is already critical and a vibratory alert (and therefore the need for balancing) is imminent.

Use of this indicator, the calculation of which is explained later on, enables objective and reproducible monitoring of the occurrence of unbalance states in the engine.

A final step (d) is an operational step of the estimated balancing margin(s) and of data representative of past balancings of the engine 1 (here this means the present engine and the other engines of the same engine model) stored in a database stored on the data-storage means 32, in light either of estimating the number of flights of the aircraft 2 before new balancing has to be achieved, or estimating the quality of a previous balancing (in particular of a newly completed balancing, i.e. just prior to the current flight). There is an explanation hereinbelow of how these two results may be obtained alternatively. It is understood that there are other cases of uses of data obtained.

The data representative of past balancings, stored in a database may be viewed as context data. More precisely, the database contains many estimations of balancing margins of aircraft 2 equipped with the same engines 1 (and having the same modules operating in the same conditions), as well as the associated balancing reports, such that it constitutes a learning base.

Figure 2:
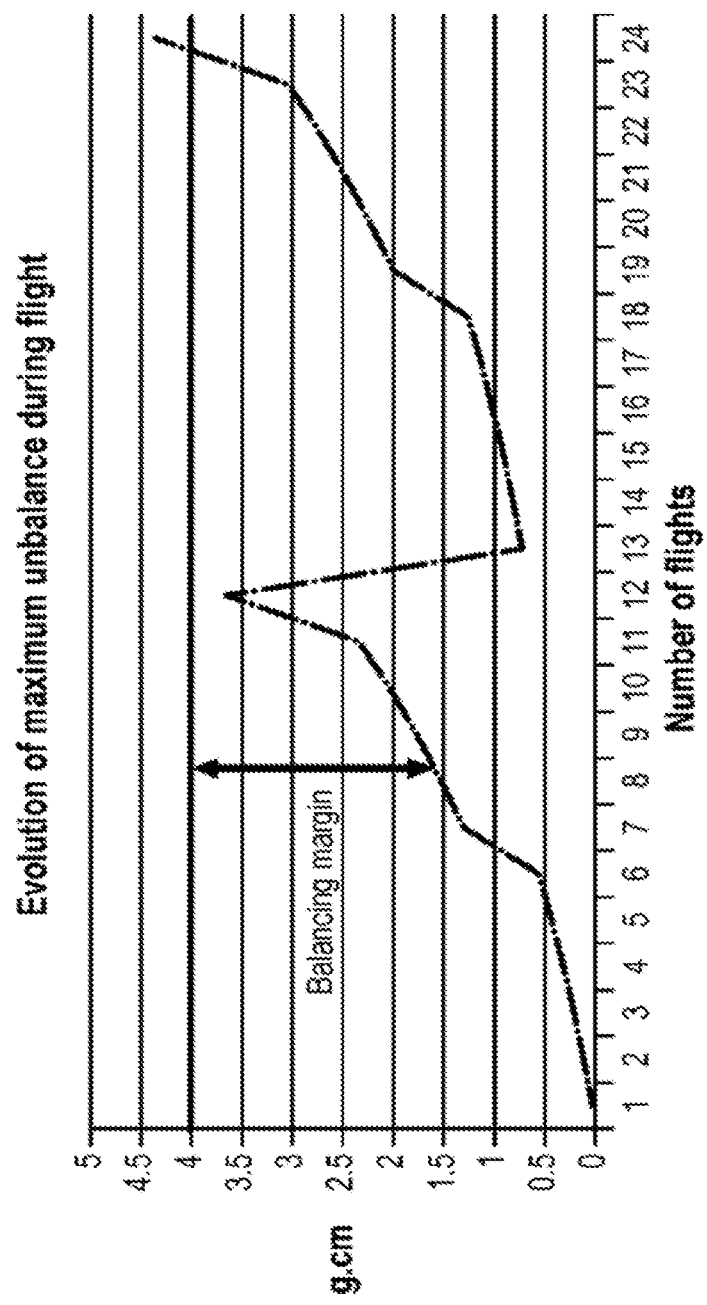
FIG. 2 illustrates an example of a curve of unbalance values obtained via the method according to the invention.

The result is a plurality of graphs of the type of that in FIG. 2, representing for a given module of an engine 1, an evolution of a maximum unbalance as a function of the series of flights (here this is a representation of the balancing margin, identified as the difference between an unbalance value and an associated maximum threshold).

In this example, it is clear that a balancing (here done correctly) takes place between the twelfth and the thirteenth flights. Each past balancing is associated in the database with an installed unbalance value (i.e., to a "corrective" unbalance intended to compensate the occurring or existing unbalance) and to a time parameter, in particular a parameter relative to the sequence of flights for knowing between which flights balancing took place (and from how many flights), and/or from how many flight hours.

In the case of a double-body engine, each balancing is low-pressure balancing and/or high-pressure balancing, which is also recorded in the database.

Acquisition of Synchronous Vibration Measurements

The estimation phase of the balancing margin for a module of the engine 1 begins with a first measuring step (a) by a sensor 20, for at least one characteristic frequency of the operation of the engine 1 (advantageously for each of the characteristic frequencies of the operation of the engine 1), of at least one vibration level value of said module, synchronous with said characteristic frequency. These "levels of synchronous vibration" are synchronized with a characteristic frequency of the engine. It is noted that the characteristic frequency or the characteristic frequencies of the engine 1 may form the object of prior measuring, as hereinbelow.

Said sensor 20 is a sensor integrated into the engine 1 (it is clear that advantageously there is a plurality of sensors 20 at different positions in the engine 1), which may send data optionally in real time to a processing unit generally located in the aircraft (for immediate or deferred exploitation (on the ground, for example) of results). Many sensors capable of measuring vibrations are known, generally providing values of acceleration, speed and/or displacement of the engine 1. The values provided are processed (directly by the sensor 20 or remotely) by spectral analysis, for example using Fourier algorithms so as to provide measuring of the frequency spectrum characteristic of vibrations of the engine. The spectrum of a vibration is the set of data of levels and frequencies of pure vibrations forming them. Possible first integration provides a vibration speed from acceleration, and any second integration provides displacement from a speed.

Within the scope of the present method, it is the values of vibration speed which are preferred. So, in the resulting spectrum the amplitude of a line indicates the maximum vibration speed obtained at the associated frequency. If the aim is a vibration level value of said engine 1 synchronous with said characteristic frequency, it therefore suffices to select the line of the spectrum at this characteristic frequency and take the amplitude of this line (or to average a narrow frequential band centered on the characteristic frequency). Advantageously, this results in a level of vibration at the LP frequency and a level of vibration at the HP frequency.

It is noted that this measurement acquisition is done advantageously once per flight phase (taxi-out, take-off, etc.). Since, as explained previously, each operational phase is associated for each characteristic frequency with a nominal value and/or a nominal derivative of the characteristic frequency, it suffices to set intervals around the nominal values coherent with the studied phase and to select an instant of operation compatible with these intervals to obtain the preferred measurement or measurements of level of synchronous vibration. Acquiring levels of vibration may also be conditioned to maintaining a speed N1 and a speed N2 (i.e. LP and HP frequencies) over a given confirmation time.

The measurements of levels of vibration per phase are combined to provide a level of vibration of the flight (always by characteristic frequency), for example by taking the maximum on the flight, or via a linear combination of the different levels of vibration per phase.

As is preferred, as explained step (a) comprises prior measuring by another sensor 20, disposed in the engine 1, of at least one characteristic frequency of the operation of the engine 1, i.e. of speeds on stabilized operation points (where the speed varies minimally). More precisely, there may be a dedicated sensor per set of modules (i.e. a sensor for the HP assembly and a sensor for the LP assembly), typically a tachometer measuring the speed of rotation of the assembly: the number of revolutions per time unit of the assembly defines the characteristic frequency.

These sensors 20 for measuring characteristic frequencies are typically positioned at the front of the engine 1 and may be offset relative to the rotor. The sensor for the LP assembly (called sensor N1) is preferably at the level of the fan, the sensor for the HP assembly (called sensor N2) and is located in the AGB ("Accessory GearBox") in conventional architectures.

Processing

In a second step (b), the data-processing means 31 estimate an unbalance value (expressed as a mass at a given distance of the axis of rotation, in g·cm in FIG. 2) for at least one module of the engine 1 (advantageously for each module of the engine 1) as a function of the values of level of vibration measured and of at least one sensitivity coefficient associated with the characteristic frequency and the module.

Advantageously, a sensitivity coefficient is available per module and speed, and per sensor 20 (typically moving by 1 mils-da for a LP module as the speed of the LP module is lower therefore less noisy and attention may be given to moving, and typically a speed of 1 ips-pk for a module HP as the moving is too noisy and it is preferred to use speed, for example).

The sensitivity coefficients are preset parameters of the algorithm, dimensionless, which reflect the impact of vibrations on people or objects transported by the aircraft 2 (pilot, passengers, and/or freight).

Therefore, a high sensitivity coefficient signifies that at the associated speed the vibrations of the module cause highly perceptible unbalance, while by comparison a low sensitivity coefficient signifies that the same vibrations of the module cause limited inconvenience only.

The coefficients may be optionally determined by learning, but preferably they are calculated as a function of the mode of use of the aircraft 2 (i.e., who or what it transports) and of the level of demand of the user (i.e., the operator of the aircraft).

Figure 3:
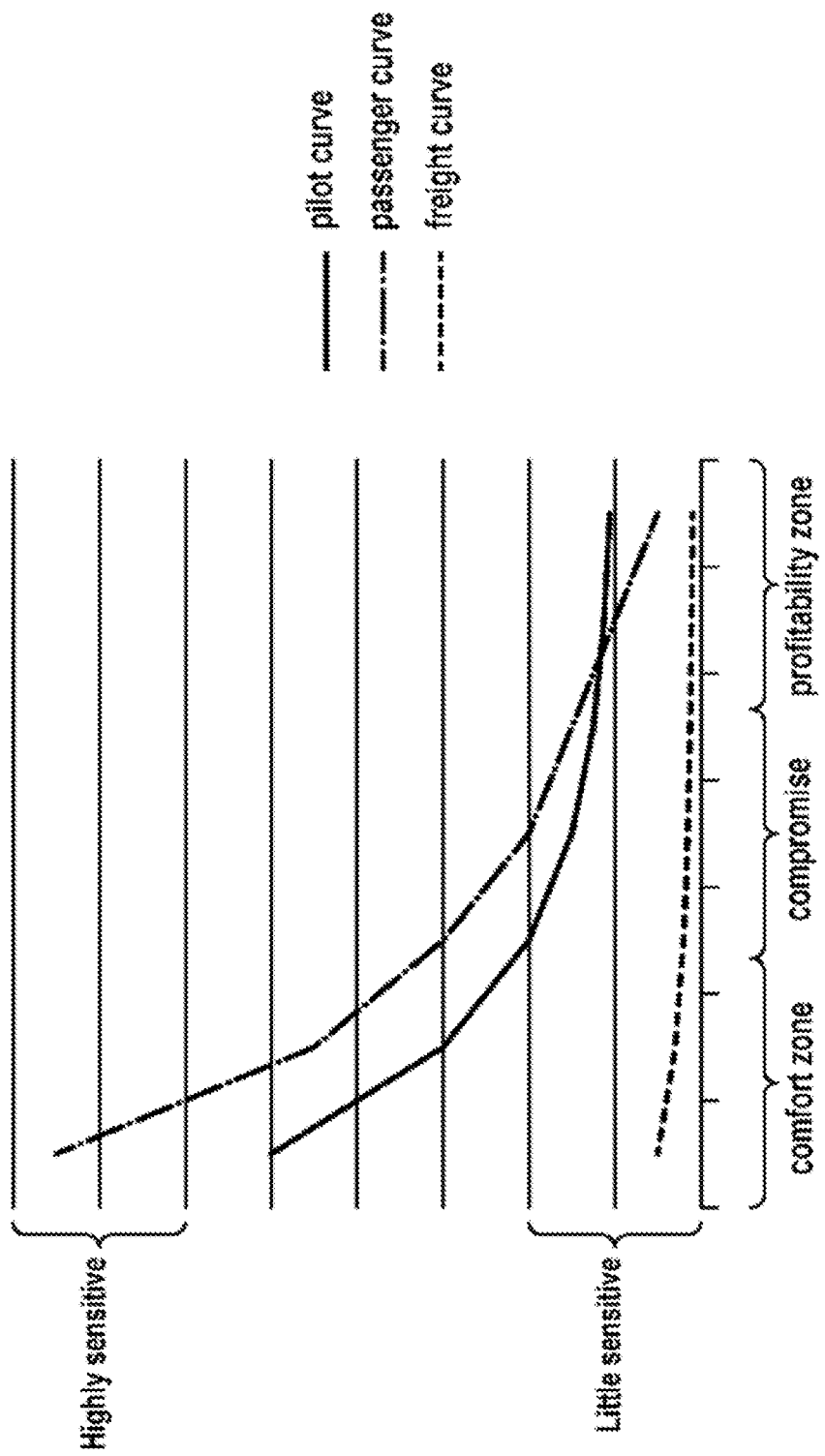
FIG. 3 illustrates curves of sensitivity to vibrations illustrating the value of sensitivity coefficients for different use of the aircraft.

In fact, it is understood that passengers, pilots or of freight will not have the same sensation of vibrations. Similarly, the level of tolerance to vibrations may depend on the type of service offered, i.e. the choice of emphasizing the quality of the flight or its profitability. The experience in fact gives sensitivity curves to the different vibrations of the type of those shown by FIG. 3, which represent elementary sensitivity coefficients associated with each of the modes of use of the engine (pilot/passengers/freight), as a function of the positioning comfort of the user Therefore, the method preferably comprises prior determination of sensitivity coefficients to be used at step (b) as a function of the flight conditions, the mode of use and the user, by way of models constructed statistically from a database relative to flights of the aircraft 2.

In fact, the finding is that each of the pilot/passengers/freight may be more sensitive to vibrations and noise during some phases of operation of the engine, i.e. at different speeds and under the effect of various modules. In particular:

pilots have high sensitivity to take-off and landing as these are phases during which they must concentrate fully;

passengers have high sensitivity in the ascent phase as it is less pleasant due to unusual acceleration for the organism, and during the cruise phase as it is long;

freight has high sensitivity to take-off this is when objects transported are the likeliest to be damaged due to violent acceleration.

These phases where sensitivity is high are called critical phases of the mode of operation.

Therefore, elementary factors $\alpha$ may be predefined, each associated with a mode of use (typically three types of user: passengers, pilot and/or freight) and with a phase of the flight, weighted as a function of the relative periods of the critical phases for said mode of operation over the whole flight to obtain sensitivity coefficients for the flight.

More precisely, each sensitivity coefficient is for example calculated per phase of the flight with the formula $$\text{Coef}_i = \alpha_{pilot} * \text{Coef}_{i_{pilot}} + \alpha_{passenger} * \text{Coef}_{i_{passenger}} + \alpha_{engineering} * \text{Coef}_{i_{engineering}},$$

with $\text{Coef}_{i_{pilot}}$ (and similarly for the other coefficients associated with passengers and freight) calculated as follows:

$$\text{Coef}_{i_{pilot}} = \frac{\text{typical } duration_{flight\ phase\ of\ i}}{\text{typical } duration_{mission}} * weighting_{phase\ i},$$

the weighting being between 0 and 1 according to the criticality of the phase. As explained, elementary factors $\alpha$ are left to the appreciation of the user so as to be representative of the usage of his aircraft 2 and preferred comfort requirements, and the present algorithm calculates the associated optimal sensitivity coefficients which will offer tolerance to unbalance and planning balancing coherent with this usage and these comfort requirements.

Calculation of the unbalance value for a module at step (b) comprises advantageously four sub-steps:

Estimation of a proportion of unbalance at each characteristic frequency on the levels of vibration measured. A theoretical level of vibration is modelled by using the proportions of unbalance of the modules contributing and the sensitivity coefficients associated with a vibratory frequency. From the value of the measured level of vibration the closest theoretical level is sought by scanning the proportions of unbalance of each module. The proportion of unbalance which forms the theoretical level of vibration closest to the measured level of vibration is therefore retained;

Estimation of a level of vibration of the module synchronous with the characteristic frequency as the product of the measured level of vibration synchronous with the characteristic frequency and the estimated proportion of the unbalance of said module synchronous with the characteristic frequency;

Estimation of an unbalance level of the module associated with each characteristic frequency as the ratio of the level of vibration of said module synchronous with the characteristic frequency on the sensitivity coefficient of said module synchronous with the characteristic frequency;

Estimation of the unbalance value as the average of the unbalance levels of said module on all characteristic frequencies In other words, in the preferred case of two LP and HP speeds, this starts by associating each module either to LP unbalance, or to HP unbalance. Proportions of unbalance for each module are estimated on the measurements of levels of vibration: in the measurements of levels of vibration synchronous with the LP frequency the proportions of unbalance of LP modules, and on the measurements of levels of synchronous vibration of the HP frequency the proportions of unbalance of the HP modules.

Next, the levels of vibration associated with each LP module (respectively HP) are estimated as the product of measurements of a level of vibration synchronous with the LP frequency (respectively HP) and the proportion of unbalance of this module.

Then, the unbalance levels at each LP module (respectively HP) are estimated as the ratio of levels of vibration associated with each LP module (respectively HP) and of the sensitivity coefficient LP (respectively HP).

Finally, the unbalance value for each module of the engine 1 are deduced as the average of the unbalance levels (calculated on several characteristic frequencies) associated with this module.

This simply provides a single unbalance value on all flight phases.

In a third step (c), the data-processing means 31 estimate a balancing margin of said module as a function of the unbalance value of said module and of a maximum threshold associated with this module (threshold parametrizable by a maintenance operator, corresponding by default to the threshold of vibratory cockpit alert). In practice a difference is made between the value of the unbalance and the threshold, as is clear from FIG. 2 for the eighth flight.

If the value of the unbalance exceeds the threshold, then urgent balancing of the module must be performed.

Exploitation of Data

According to a first embodiment, step (d) consists of estimation of the quality of previous balancing as a function of said estimated balancing margins and data representative of past balancings stored in the database.

The action of balancing is evaluated by an indicator of quality which measures for each module (for example in terms of percentage) the unbalance level/balancing margin attains after balancing relative to a target level.

This is done for example by calculating the variation in balancing margin (in absolute or relative value) during balancing. The graphic of FIG. 2 for example clearly shows a drop in the unbalance value from 3.75 to 0.75 g·cm, or a rise in the balancing margin from 0.25 to 3.25 (multiplied by eleven), which reveals successful and quality balancing. The closer the balancing margin is to the threshold (i.e. the closer the residual unbalance after balancing is to zero) the better the balancing.

The quality is defined as satisfactory or not by comparison of the indicator of quality with those of past balancings for which data are stored in said base.

In the event where restoration of the balancing margin is no longer satisfactory (high unbalance level after balancing operation), a complementary maintenance operation may be initiated as soon as possible to prevent the rise of vibratory cockpit alerts for the pilot. The aim is to offer the best service and the best level of security possible.

According to a second embodiment, step (d) consists of estimating a number of flights of said aircraft 2 before balancing, as a function of said estimated balancing margins and data representative of past balancing stored in the database.

Using the balancing margin of a module makes it possible to perform calculation of tendency or make an extrapolation (linear, polynomial, spline, etc.) on the data of the database to estimate the number of flights or the number of flight hours feasible before it is necessary to perform a new balancing.

This solution sets up a prognosis for an engine 1 on the period between two successive balancings and constructs an indicator on the balancing frequency within a fleet of engines 1, such that it is possible to optimize the maintenance strategy associated with this operation.

Advantageously an indicator of tendency may be ascertained, based on the gradient originating from average linear regression on a parametrizable number of flight hours or flights.

For example, FIG. 4a illustrates the result of calculation of linear regression on a sliding window of five flights from the graphic of FIG. 2, and FIG. 4b illustrates the derivative of the curve of FIG. 4a.

In all cases, the results obtained (estimation of the remaining number of flights of said aircraft 2 before balancing and/or of the indicator of quality of the precedent balancing) must be able to be viewed via interface means 33 to enable their analysis and their tracking by industry experts.

These data will advantageously also enrich the database 32 of balancings.

Equipment and System

The equipment 3 (shown in FIG. 1) for carrying out the method which has just been described (monitoring an engine 1 of an aircraft 2 operating during a flight) comprises data-processing means 31, data-storage means 32, and interface means 33.

The data-storage means 32 store data representative of past balancings in a database.

The data-processing means 31 are configured to:
for at least one characteristic frequency of the operation of the engine 1, receive from a sensor 20 disposed in the engine 1 at least one vibration level value synchronous with said characteristic frequency;
for at least one module of said engine 1, estimate an unbalance value of said module as a function of said values of level of vibrations measured and of at least one sensitivity coefficient of said module associated with said characteristic frequency;
estimate a balancing margin of said module as a function of the unbalance value of said module and of a maximum threshold associated with the module;
estimate a remaining number of flights of said aircraft 2 before balancing and/or of the quality of a previous balancing as a function of said balancing margins estimated and data representative of past balancings stored in a database stored on data-storage means 32;
transmit the result to interface means 33

As explained, the equipment 3 is preferably registered in a system also comprising an engine 1 of an aircraft 2 equipped with the sensor 20 measuring the level or the levels of synchronous vibration.

Computer Program Product

According to a fourth and a fifth aspects, the invention relates to a computer program product comprising code instructions for executing (on data-processing means 31, in particular those of the equipment 3) a method according to the first aspect of the invention for monitoring an engine 1 of an aircraft 2 operating during a flight, as well as storage means readable by computer equipment (e.g. the data-storage means 32 of this equipment 3) housing this computer program product.

The invention claimed is:

1. A method for monitoring an aircraft engine operating during a flight of an aircraft, the method comprising:
   measuring, using a sensor disposed in the aircraft engine, a vibration level value synchronous with a characteristic frequency of the operation of the aircraft engine;
   estimating, using a processor, an unbalance value of a module of the aircraft engine as a function of the measured vibration level value and of a sensitivity coefficient of said module associated with said characteristic frequency;
   estimating, using the processor, a balancing margin of said module as a function of the unbalance value of said module and a maximum threshold associated with the module; and
   estimating at least one of a remaining number of flights of said aircraft before balancing or an indicator of quality of a previous balancing as a function of the estimated balancing margin and of data representative of past balancings of the aircraft engine stored in a database stored on a data-storage device, and transmitting to the at least one of the remaining number of flights or the indicator of quality of the previous balancing to a user interface.

2. The method according to claim 1, further comprising prior measuring by another sensor disposed in the aircraft engine of the characteristic frequency of the operation of the aircraft engine.

3. The method according to claim 1, wherein said engine is an at least double body engine having at least two characteristic frequencies including a low-pressure frequency (LP) and a high-pressure frequency (HP), each balancing being at least one of a low-pressure balancing or high-pressure balancing.

4. The method according to claim 3, wherein the LP frequency is a rotation frequency of a low-pressure assembly of the aircraft engine and the HP frequency is a rotation frequency of a high-pressure assembly of the aircraft engine.

5. The method according to claim 4, wherein each module of the aircraft engine is associated with the high-pressure assembly or with the low-pressure assembly, and selected from a fan, at least one turbine, and at least one compressor.

6. The method according to claim 1, wherein each past balancing is associated with an installed unbalance value and a time parameter.

7. The method according to claim 1, wherein said flight of said aircraft comprises a sequence of operational phases of said aircraft engine, each operational phase having, for each characteristic frequency, at least one of a nominal value or a nominal derivative of the characteristic frequency,
   wherein said measuring comprises measuring the vibration level value of said engine for one of said phases of the operation, the measuring being taken at an instant of said operational phase such that the characteristic frequency has at least one of an instantaneous value or a derivative substantially equal respectively to the nominal value and to the nominal derivative of the characteristic frequency associated with the operational phase.

8. The method according to claim 1, wherein said vibration level value of said module synchronous with said characteristic frequency corresponds to an amplitude of said characteristic frequency in a frequency spectrum of vibration of the aircraft engine.

9. The method according to claim 1, wherein said estimating comprises:
   for each characteristic frequency, estimating a proportion of unbalance of the module at the characteristic frequency as a function of the measured vibration level value;
   for each characteristic frequency, estimating a level of vibration of the module synchronous with the characteristic frequency;
   for each characteristic frequency, estimating an unbalance level of the module associated with the characteristic frequency; and
   estimating the unbalance value.

10. The method according to claim 9, wherein:
    the level of vibration of the module synchronous with a characteristic frequency is estimated as a product of the measured level of vibration synchronous with the characteristic frequency and the estimated proportion of the unbalance of said module synchronous with the characteristic frequency;
    the unbalance level of the module associated with a characteristic frequency is estimated as a ratio of the level of vibration of said module synchronous with the characteristic frequency on the sensitivity coefficient of said module synchronous with the characteristic frequency; and
    the unbalance value is estimated as an average of the unbalance levels of said module associated with each of the characteristic frequencies.

11. A non-transitory computer readable medium on which a computer program product comprises code instructions for executing a method according to claim 1 for monitoring an aircraft engine operating during a flight of an aircraft.

12. The method according to claim 1, further comprising performing a balancing of the aircraft engine according to at least one of the estimated remaining number of flights or the indicator of quality of the previous balancing.

13. An equipment for monitoring an aircraft engine operating during a flight of an aircraft, comprising:
    a processor;
    a data-storage device which stores a database of data representative of past balancings of the aircraft engine; and
    a user interface,
    wherein the processor is configured to:
       receive, from a sensor disposed in the aircraft engine, a vibration level value synchronous with a characteristic frequency of the operation of the aircraft engine;
       estimate an unbalance value of a module of the aircraft engine as a function of the value of level of measured vibrations and of a sensitivity coefficient of said module associated with said characteristic frequency;
       estimate a balancing margin of said module as a function of the unbalance value of said module and of a maximum threshold associated with the module;
       estimate at least one of a remaining number of flights of said aircraft before balancing or a quality of a previous balancing as a function of the estimated balancing margin and of the data representative of past balancings of the engine stored in the database stored on the data-storage device; and transmit the at least one of the remaining number of flights or the quality of the previous balancing to the user interface.

14. A system comprising:

an aircraft engine equipped with a sensor for measuring at least one vibration level value synchronous with a characteristic frequency of the aircraft engine;

the equipment according to claim 13 for monitoring an aircraft engine operating during a flight.

* * * * *